Patented June 10, 1952

2,600,221

UNITED STATES PATENT OFFICE 2,600,221

CLEANSING METHOD

Emil Domingo, New York, N. Y.

No Drawing. Application March 28, 1950,
Serial No. 152,503

16 Claims. (Cl. 250—71)

This invention relates to a method of cleansing articles, and to the detection of soil in the form of organic or inorganic matter adhering to the surface on inadequately cleansed articles. More particularly, the invention relates to a method of detecting organic contamination on food utensils by coating the surface of said utensils with a chemical solution which causes the contaminating matter to fluoresce characteristically under the influence of an appropriate light band, such as ultraviolet light.

It is an object of the invention to provide means for the detection of organic contamination on food utensils or other articles with speed and certainty.

It is a further object of the invention to provide means for utensil examination that does not require the drying of same and can be applied in the interval between the washing and using of the utensils without interfering with the usual routine, and permitting the examination of all of the articles washed instead of merely a sample portion of them.

It is also an object of the invention to provide a general method of utensil inspection applicable to virtually all of the food residues, whether or not of oleaginous, phosphatidic, starchy, protein, or inorganic-protein-complex, character.

Another object of the invention is to provide a utensil inspection procedure that can be applied with portable equipment.

A still further object is to provide a rapid and simple method for detecting residues of detergents and germicides, such as quaternary ammonium compounds left on improperly rinsed utensils.

Additional objects of the invention will be apparent from the discussion hereinafter.

In many States and cities there is a statutory provision for the maintenance of certain hygienic standards in connection with public food utensils such as, reusable milk bottles, milk cans, milk tanks, cooking pans, service plates (ceramic and plastic), glasses, silverware, and the like. The manual or automatic methods for washing these utensils in some establishments is occasionally insufficient for complete cleansing as demonstrated by bacteriological and other tests made on sample specimens when brought to the central city or State testing laboratory. Prior to the present invention such tests have been involved, expensive, and time consuming. By means of this invention, organic contamination residues from common foods and the complex inorganic-protein residues from milk products remaining on the surface of such utensils may be detected quickly and surely, even by relatively unskilled workers.

Part of these residues remain on the surface of the utensils in the form of minute discrete particles which are too small to be readily seen with the naked eye, or in the form of thin films which are not visible under ordinary light such as is commonly used in commercial inspection. Such particles and films, after being treated with a fluorochrome material, such as a fluorescent dye, become easily visible by the bright fluorescent light they emit under the influence of ultraviolet light radiations. The fluorescence obtained in such cases is of a character and intensity as to be easily recognized.

The following example illustrates without limiting the invention.

A dilute solution of a fluorochrome, such as fluorescent dye, or a mixture of several of them is prepared in the proper solvent, such as water, water and alcohol, or water with alkaline or acid salts. The concentration of the fluorochrome material may vary widely, but in general only a few parts per million will be sufficient, and an excess, while giving the desired fluorescent effect, may also stain the clean surface of the utensil. For general purposes 50 to 500 parts of such fluorochromes as primuline or fluorescent purple 2G per million parts of water will be found satisfactory. It is to be understood that the complete solution of the fluorochrome is to be made with the addition of such other chemicals as is well known to those skilled in the art, and that the solution is to be used at the proper pH, as is well known in the literature pertaining to this subject.

If the object to be examined is small, such as a glass, plate, or fork, it may be immersed in the solution. If the object is large, such as a milk can or tank, the solution may be applied to its surface by means of a sprayer or other similar device. This application of the fluorochrome solution may be effected after the ordinary washing process, with a subsequent rinsing of the solution, or it may be applied prior to the regular washing operation. In the latter case the usual washing and rinsing operations remove the excess of the activating solution.

After the object is treated as described above, it is exposed to ultraviolet light, preferably in a dimly lighted room. If the article is contaminated with adhering organic matter it will be found that the fluorochrome has been adsorbed on, and/or chemically combined with, the organic matter in such a way that it will resist the effect of the subsequent rinsing, when the excess of uncombined material will wash off. Therefore, when the surface so treated is irradiated with ultraviolet light the organic matter with the combined fluorochrome will fluoresce with a distinct color differing from the color of the solution itself or the dry remants of the solution that may have been left on a perfectly clean surface. A weak solution of primuline for example, appears light yellow in daylight but fluoresces with a strong purplish blue under the ultraviolet light. However, when it is adsorbed on, or chemically combined with, organic matter adhering to the surface of an article, it appears bright yellowish green or greenish blue in color, the hue depending on the composition and age of the residues. If it is a streak of fresh milk the fluorescent color under the ultraviolet light is bright whitish blue, but if the milk is stale, the color is less intense yellow; and the complex inorganic-protein residues from milk commonly known as "milkstone" will show up with a characteristic yellowish color.

In any event there is a marked visible contrast between the clean and the contaminated areas. This contrast may be accentuated by rinsing the treated utensil so as to remove the unreacted fluorochrome from the clean areas. The contrast may be still further accentuated by the use of a suitable filter before the eyes when making the examination. This filter may be a sheet of plastic or glass of the proper color characteristic held in front of the eyes, or the glass or plastic may be fitted to the usual spectacle frame. In general a yellow, orange, amber, green, or yellow-green filter will be found to give good contrasty results. The selection of the filter color depends upon the fluorochrome used, the specific type of soil to be detected on the treated articles, and the visual characteristics of the individual observer. An additional advantage of using a viewing filter is that it absorbs the ultraviolet light and shields the eyes from the annoyance of the fluorescence of some of the interior parts of the eye itself when exposed to ultraviolet light, and also eliminates the visible blue and purple light from the ultraviolet source.

The ultraviolet light may be obtained from a suitable light source with an intervening filter, such as that commonly known as Wood's glass, which cuts off most of the visible light as is well known to those skilled in the art. Virtually any of the ultraviolet lamps commercially available are suitable for use in the method of this invention, as for example, the mercury vapor lamp, cadmium, argon, or carbon arc lamps. For the purpose of this method I prefer to use a light band with the maximum transmission at about 3600 Angstrom units and with as little visible light as possible.

For the purpose of inspection the examination is performed preferably while the article is still wet, just after the last rinsing, but with some fluorochromes the examination may be made after the utensil is dry. Some articles treated with fluorochromes, such as primuline, will exhibit the same strong fluorescence after several months, and even years.

An advantage of the invention is its general applicability to various types of commercial utensils, whether ceramic, glass, metal, or plastic. While some of these materials may be found to be naturally fluorescent, no case has been found in which the fluorescent color of the utensil material is the same as that of the organic matter residues on its surface. Also, while it is known that some food soil residues, such as oleaginous films or milk remnants may be naturally fluorescent under ultraviolet light, not all such residues from food will show similar fluorescence, this characteristic depending upon the chemical composition of the solid residues and the state of oxidation of the several components, such as the fats and oils or other constituents.

It is true that by the simple examination of an article under ultraviolet light, without treatment with a fluorochrome, some of the food soil residues may fluoresce more or less strongly, but others will not show any fluorescence at all. However, with the addition of the fluorochrome chemical all of the organic matter will be brought out by the strong fluorescence of the combination, which would not ordinarily be the case without this addition. It is easy to see that while it may be possible to detect some uncleanliness in utensils without the addition of fluorochrome materials, the only assurance of having a perfectly clean utensil comes from the addition of such material.

Another advantage of this invention is its adaptability to the continuous inspection of articles washed in mechanical washing machines with multiple jets and tanks, such as those used for washing dishes in restaurants, and those used for washing milk shipping cans, in which the utensils are treated successively with washing solution in one position of the machine and with rinsing solution in another position, followed by a clear water rinse in still another position along the path of travel of the utensil. With machines of this type the fluorochrome solution may be applied in one of the intermediate tanks, either by spraying it on the utensil separately, or by addition to the washing or rinsing solution. The ordinary rinsing steps which complete the washing operation will remove the excess of applied material. In this method all of the utensils can be inspected as they leave the machine without any interference with the normal operation of the machine, or with the usual operational procedure, the only modification being the installation of an ultraviolet lamp at some point convenient to the discharge end of the machine. If the machine is of the type having a single tank such as is commonly used for dishwashing in restaurants, it is preferable to treat the dishes before washing by immersing them in a tank of the treatment solution, after which they may be put through the washing machine in the usual way, the examination of the dishes being made in the manner already described.

While the procedures already described are intended to be carried out by observing the emitted fluorescence of the treated material with the human eye, it is also within the scope of the invention to provide any other light-sensitive receptor, such as a photo-electric cell means, to observe the condition of the articles under examination. Such light-sensitive means may also include means which will signal the condition of the articles, or perform some function such as to set aside unclean articles as they pass by the receptor.

Wherever, in the specification and in the claims, the word fluorochrome is used it is meant to include a chemical substance that, while not being a dye as commonly described in the literature, by virtue of its composition or dilution will react with other substances to cause the resultant product to fluoresce under ultraviolet light. This reaction may be chemical, physico-chemical, or simply physical. These substances may, or may not have a visible color under ordinary light, such as weak solutions of beta methyl umbeliferone, R-salt, primuline, and the various derivatives of stilbene di- or tri-sulphonic acid. By "fluorescent dye" is meant an ordinary dye that will cause the substance or material it is adsorbed on, or absorbed by, to exhibit fluorescence under ultraviolet light. The word "fluorochrome" is also intended to cover "fluorescent dyes." The phenomenon of fluorescence is not further described as it is well known to those familiar with the literature on the subject.

For the purpose of this method a large number of fluorochromes can be used, among which may be mentioned the following materials which are listed in the "Colour Index," a publication of the British Society of Dyers and Colourists. The numbers following the initials "C. I." refer to the identification in the "Index."

C. I. 127 geranin G
C. I. 365 direct brilliant yellow
C. I. 371 acriflavin
C. I. 622 diazine fast yellow
C. I. 654 diazo fast yellow 2G
C. I. 655 auramin O or OO
C. I. 749 rhodamine B
C. I. 793 phosphine GN
C. I. 812 primuline
C. I. 813 titan yellow
C. I. 816 thioflavine S The following materials are representative of those which have no "Colour Index" reference number because they are either too newly developed, not well defined, or not classed as dyestuffs:

esculin
    eosine
    R-salt
    acridines
    berberine
    anthracene
    berberine sulphate
    sulpho rhodamine
    derivatives of stilbene
    beta methyl umbeliferone
    acetate fluorescent blue I
    calcomine fluorescent violet 2G
    euchrysine
    quinine sulphate
    tinopal BVA
    chrysorubine
    phosphine 2RN
    thioflavine TG It will thus be seen that the invention provides a ready means for inspecting and testing food utensils with portable equipment thereby eliminating the necessity of taking specimens of the utensils to a central testing laboratory.

It is to be understood that this invention is not limited to the embodiments disclosed, which are given by way of example, but that this invention may be modified and varied by those skilled in the art. The invention is to be construed broadly and limited only by the annexed claims.

I claim:

1. The method of examining a surface for visually undetectable organic contamination that includes the steps of treating the surface with an excess of chemical solution that is selectively sorbed by the organic contamination and rinsing the surface to remove the excess solution not sorbed to cause said contamination to become visually evident and distinct from portions of the surface not so contaminated when exposed to an appropriate light band.

2. The method of examining a food utensil for visually undetectable organic contamination that includes the steps of coating the appropriate surface of said utensil with a fluorochrome chemical excitable by an appropriate light band, rinsing said surface, and exposing the thus treated surface to such light, whereby any organic contamination on said surface will be caused to fluoresce in visual effect different from that of said fluorochrome chemical or said contamination alone, whereby the extent and character of said contamination will be emphasized.

3. The method according to claim 2 in which the light band is essentially ultraviolet.

4. The method according to claim 3 in which the fluorochrome chemical is applied in dilute aqueous solution.

5. The method according to claim 4 in which the utensil is rinsed in water following the application of fluorochrome chemical.

6. The method according to claim 5 in which light from the ultraviolet light excited surface is passed through a contrasting filter and thereafter transmitted to a light sensitive receptor means.

7. The method according to claim 6 in which the fluorochrome chemical is primuline.

8. The method of examining a non-absorbent food utensil for contamination by organic materials which are normally invisible by contrast with the surface of said utensil that includes the steps of coating the appropriate surface of said utensil with a fluorescent dye which is a member of the group of thiazole dyes to react with said contamination, rinsing said surface, and exposing the surface thus treated to essentially ultraviolet light, whereby any organic contamination on said surface will be caused to fluoresce in accordance with its deterioration in a manner characteristic of said reaction and different from the uncontaminated surface.

9. The method of examining a non-absorbent food utensil for contamination by organic materials which are normally invisible by contrast with the surface of said utensil that includes the steps of coating the appropriate surface of said utensil with a fluorochrome chemical which is a derivative of stilbene to react with said contamination, rinsing said surface, and exposing the surface thus treated to essentially ultraviolet light, whereby any organic contamination on said surface will be caused to fluoresce in accordance with its deterioration in a manner characteristic of said reaction and different from the uncontaminated surface.

10. The method of detecting milk residues on a surface which comprises the steps of coating the surface with a weak aqueous solution of primuline, rinsing the surface with water and exposing the surface to ultraviolet light.

11. The method of cleansing articles which have been subjected to contact with milk including the steps of applying a fluorochrome solution to the surface of the article in connection with a rinsing operation, performing another rinsing operation on the article sufficient to remove excess fluorochrome solution, and exposing the surface of the article to ultraviolet light to detect milk film on the surface thereof.

12. The method of cleansing articles used for handling food in which the articles are subjected to a washing and a rinsing operation including the steps of incorporating a fluorochrome solution in the washing solution, and exposing the surface of the article to ultraviolet light after said rinsing operation to detect organic contamination.

13. The method of cleansing articles used for handling food in which the articles are subjected to a washing and a rinsing operation including the steps of incorporating a fluorochrome solution in said rinsing solution, performing another rinsing operation on the article with clear water, and exposing the surface of the article to ultraviolet light to detect organic contamination.

14. The method of cleansing articles used for handling food in which the articles are subjected to a washing and a clear water rinsing operation including the steps of applying a fluorochrome solution to the surface of the article before performing said washing operation, and exposing said article to ultraviolet light after said rinsing operation is performed to detect the presence of organic contamination.

15. The method of detecting thin films of quaternary ammonium compounds adsorbed on the surface of an article which includes the steps of coating the surface of said article with a dilute solution of a fluorochrome chemical which is a member of the thiazole group adapted to make said film fluorescent, rinsing the excess of said solution from the surface with water, exposing said treated surface to ultraviolet light, and observing said surface through a contrasting filter whereby an adsorbed film of material will be recognized by the character of its fluorescence.

16. The method according to claim 15 in which the fluorochrome chemical is primuline.

EMIL DOMINGO.

REFERENCES CITED

The following references are of record in the file of this patent:

UNITED STATES PATENTS

| Number | Name | Date |
| --- | --- | --- |
| 2,046,940 | Fitger et al. | July 7, 1936 |
| 2,449,274 | Broll | Sept. 14, 1948 |

OTHER REFERENCES

Fluorescent Penetrant by G. Ellis, Steel October 16, 1944, pgs. 100–102 and 164.

Luminescence by P. Pringsheim, et al. Intersciences, Publishers Inc., 1943, pgs. 116–119.